US009820332B2

(12) United States Patent
Lee et al.

(10) Patent No.: US 9,820,332 B2
(45) Date of Patent: Nov. 14, 2017

(54) METHOD FOR DEACTIVATING SCELLS DURING SCG CHANGE PROCEDURE AND A DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 174 days.

(21) Appl. No.: 14/730,599

(22) Filed: Jun. 4, 2015

(65) Prior Publication Data

US 2016/0044744 A1    Feb. 11, 2016

Related U.S. Application Data

(60) Provisional application No. 62/034,158, filed on Aug. 7, 2014.

(51) Int. Cl.
| | |
|---|---|
| *H04W 76/06* | (2009.01) |
| *H04W 16/32* | (2009.01) |
| *H04W 76/04* | (2009.01) |
| *H04W 88/12* | (2009.01) |

(52) U.S. Cl.
CPC ......... *H04W 76/068* (2013.01); *H04W 16/32* (2013.01); *H04W 76/064* (2013.01); *H04W 76/046* (2013.01); *H04W 88/12* (2013.01)

(58) Field of Classification Search
None
See application file for complete search history.

(56) References Cited

U.S. PATENT DOCUMENTS

| | | | |
|---|---|---|---|
| 2012/0257513 A1 | 10/2012 | Yamada | |
| 2012/0281548 A1* | 11/2012 | Lin | H04W 36/30 370/242 |
| 2014/0016593 A1* | 1/2014 | Park | H04L 5/001 370/329 |
| 2015/0215930 A1* | 7/2015 | Kim | H04W 52/0212 370/329 |

(Continued)

OTHER PUBLICATIONS

Intel Coproration, "System Information Provisioning for SCG," 3GPP TSG RAN WG2 Meeting #86, R2-12042, May 2014, 4 pages.*

(Continued)

*Primary Examiner* — Charles C Jiang
*Assistant Examiner* — George Atkins, Jr.
(74) *Attorney, Agent, or Firm* — Lee Hong Degerman Kang Waimey

(57) ABSTRACT

The present invention relates to a wireless communication system. More specifically, the present invention relates to a method and a device for deactivating SCells during SCG change procedure in the wireless communication system, the method comprising: configuring a PCell (Primary Cell) in a master base station (BS) and a PSCell (Primary-Secondary Cell) and one or more SCells (Secondary Cells) in a secondary BS; receiving an RRC (Radio Resource Control) reconfiguration message indicating a SCG (Secondary Cell Group) change procedure while maintaining a connection with the master base station; and deactivating the one or more SCells in the secondary BS if the PSCell is not changed by the SCG change procedure.

10 Claims, 21 Drawing Sheets

(56) References Cited

U.S. PATENT DOCUMENTS

| 2015/0271713 A1* | 9/2015 | Kim ................... | H04W 36/0055 |
| | | | 455/437 |
| 2016/0219604 A1* | 7/2016 | Fujishiro ............. | H04W 72/085 |
| 2016/0255671 A1* | 9/2016 | Rahman .............. | H04W 76/025 |
| | | | 370/329 |
| 2017/0181216 A1* | 6/2017 | Worrall ............... | H04W 76/028 |

OTHER PUBLICATIONS

Alcatel-Lucent, et al., "Discussion on Special SCell (SPcell) Change Procedure," 3GPP TSG RAN WG2 Meeting #85, R2-140749, Feb. 2014, 6 pages.*
Intel Corporation, "System information provisioning for SCG," 3GPP TSG RAN WG2 Meeting #86, R2-142042, May 2014, 4 pages.
Huawei, et al., "pSCell related functionalities and procedures," 3GPP TSG-RAN WG2 Meeting #86, R2-142027, May 2014, 5 pages.
Samsung, "Dual connectivity, introducing optimised SCG modification," 3GPP TSG-RAN2 #86 meeting, Tdoc R2-142485, May 2014, 3 pages.
PCT International Application No. PCT/KR2015/005883, Written Opinion of the International Searching Authority dated Oct. 13, 2015, 12 pages.

* cited by examiner

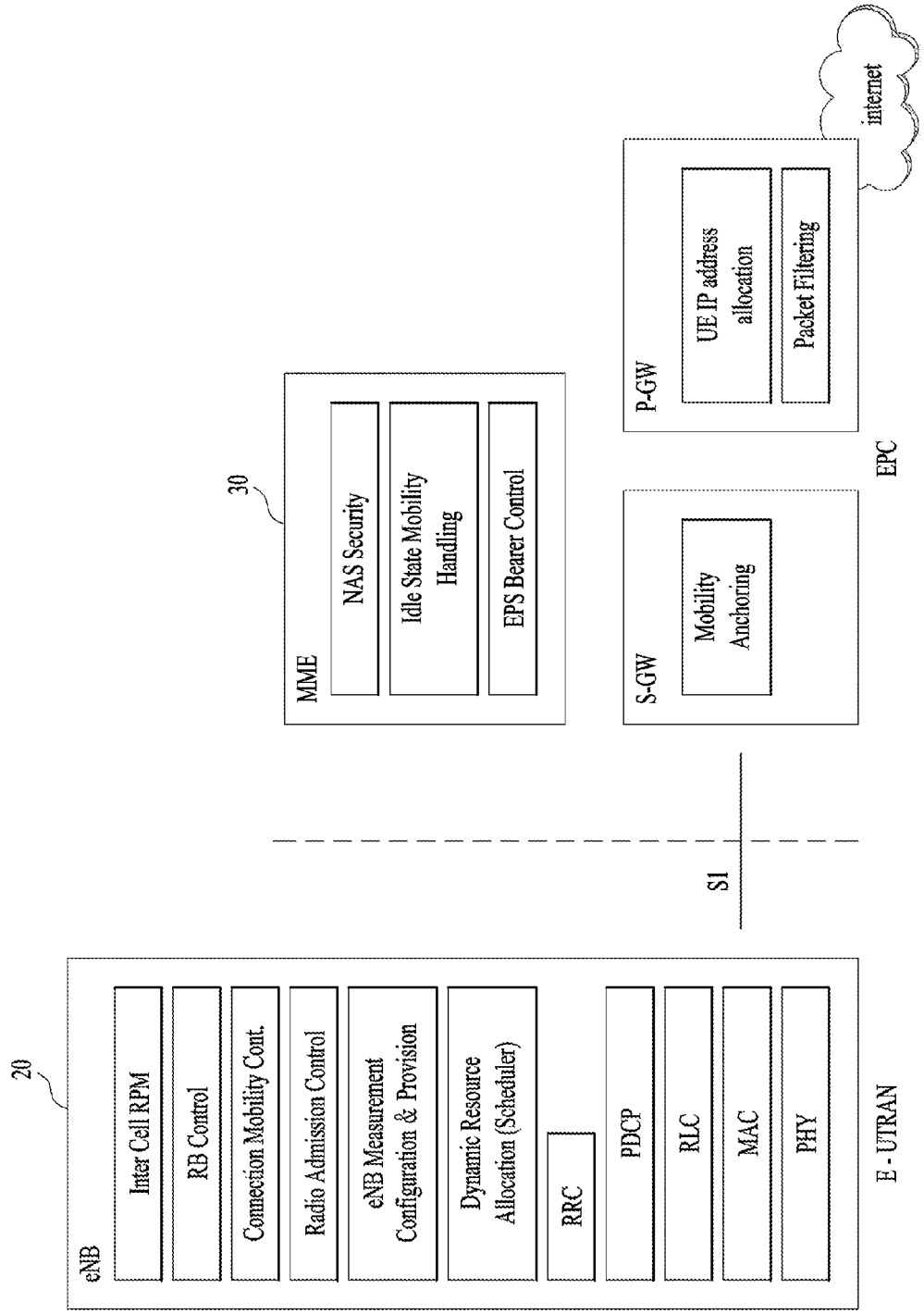

FIG. 3
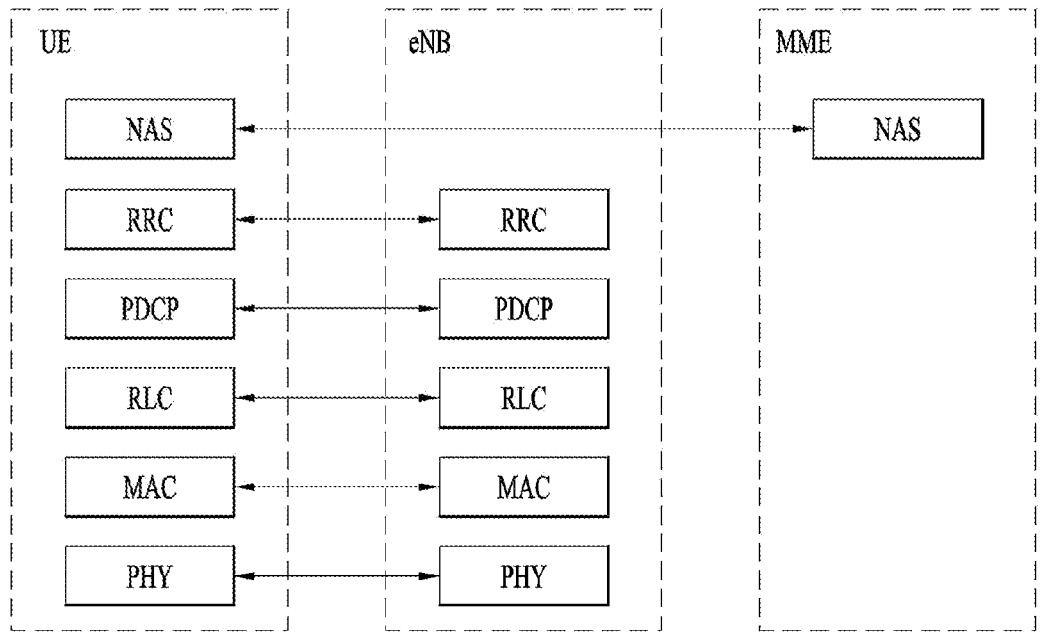
(a) Control-Plane Protocol Stack
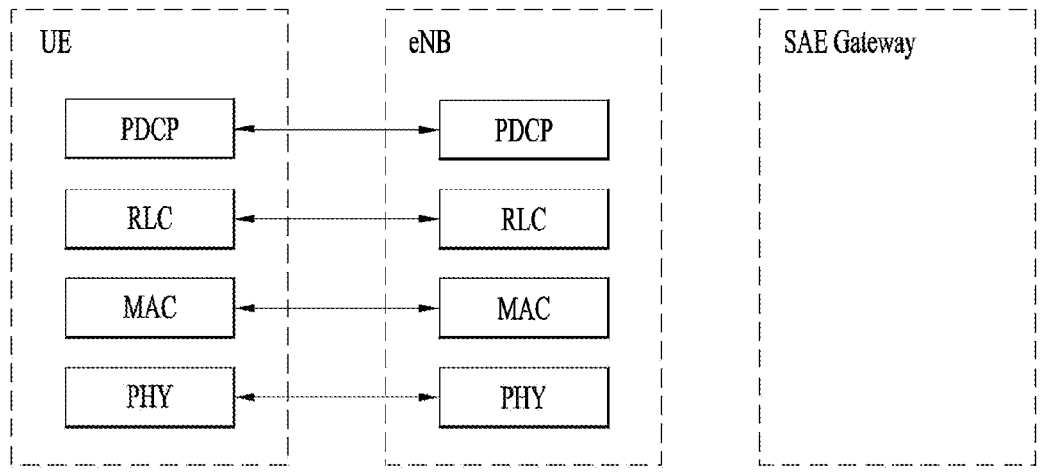
(b) User-Plane Protocol Stack Component carrier 5 component carriers → 100 MHz Oct 1

(a) C-Plane connectivity of eNBs involved in dual connectivity (b) U-Plane connectivity of eNBs involved in dual connectivity

FIG. 13

| | Scenario 1 | Scenario 2 | Scenario 3 | Scenario 4 |
|---|---|---|---|---|
| Cell 1 | Release and Addition | [Issue 2: PScell → SCell]<br>- Reconfiguration ;or<br>- Release and Addition | [Issue 2: PScell → SCell]<br>- Reconfiguration ;or<br>- Release and Addition | Release |
| Cell 2 | Release and Addition | [Issue 3: PScell → SCell]<br>- Reconfiguration ;or<br>- Release and Addition | [Issue 4: PScell → SCell]<br>- Reconfiguration ;or<br>- Release and Addition | Release |
| Cell 3 | N/A | N/A | [Issue 1]<br>Addition | N/A |
| Cell 4 | N/A | N/A | N/A | [Issue 1]<br>Addition |

METHOD FOR DEACTIVATING SCELLS DURING SCG CHANGE PROCEDURE AND A DEVICE THEREFOR

Pursuant to 35 U.S.C. §119(e), this application claims the benefit of U.S. Provisional Patent Application No. 62/034,158, filed on Aug. 7, 2014, the contents of which are hereby incorporated by reference herein in its entirety.

BACKGROUND OF THE INVENTION

Field of the Invention

The present invention relates to a wireless communication system and, more particularly, to a method for deactivating SCells during SCG change procedure and a device therefor.

Discussion of the Related Art

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

SUMMARY OF THE INVENTION

The object of the present invention can be achieved by providing a method for operating by an apparatus in wireless communication system, the method comprising; configuring a PCell (Primary Cell) in a master base station (BS) and a PSCell (Primary-Secondary Cell) and one or more SCells (Secondary Cells) in a secondary BS; receiving an RRC (Radio Resource Control) reconfiguration message indicating a SCG (Secondary Cell Group) change procedure while maintaining a connection with the master base station; and deactivating the one or more SCells in the secondary BS if the PSCell is not changed by the SCG change procedure.

In another aspect of the present invention provided herein is an apparatus in the wireless communication system, the apparatus comprising: an RF (radio frequency) module; and a processor configured to control the RF module, wherein the processor configures a PCell (Primary Cell) in a master base station (BS) and a PSCell (Primary-Secondary Cell) and one or more SCells (Secondary Cells) in a secondary BS, to receive an RRC (Radio Resource Control) reconfiguration message indicating a SCG (Secondary Cell Group) change procedure while maintaining a connection with the master base station, and to deactivate the one or more SCells in the secondary BS if the PSCell is not changed by the SCG change procedure.

Preferably, the method further comprises: deactivating the PSCell and all SCells except a new PSCell in the secondary BS if the new PSCell different from the PSCell is added by the SCG change procedure.

Preferably, if the RRC reconfiguration message indicates changing from the PSCell to the new PSCell in the secondary BS, the RRC reconfiguration message includes at least one of: an indication of the new PSCell; an indication of changing from the PSCell to the new PSCell; an indication of releasing of the PSCell and addition of the new PSCell; an indication of addition off the new PSCell; an indication of an SCell to a used as the new PSCell; or an indication of a secondary BS in which the new PSCell is changed.

Preferably, the method further comprises: stopping a SCell deactivation timer for SCells in the second BS when the one or more SCells in the secondary BS are deactivated.

Preferably, one or more SCells in the master BS does not change activation or deactivation state.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 13 is a diagram for PSCell change procedure for Dual Connectivity;

DETAILED DESCRIPTION OF THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
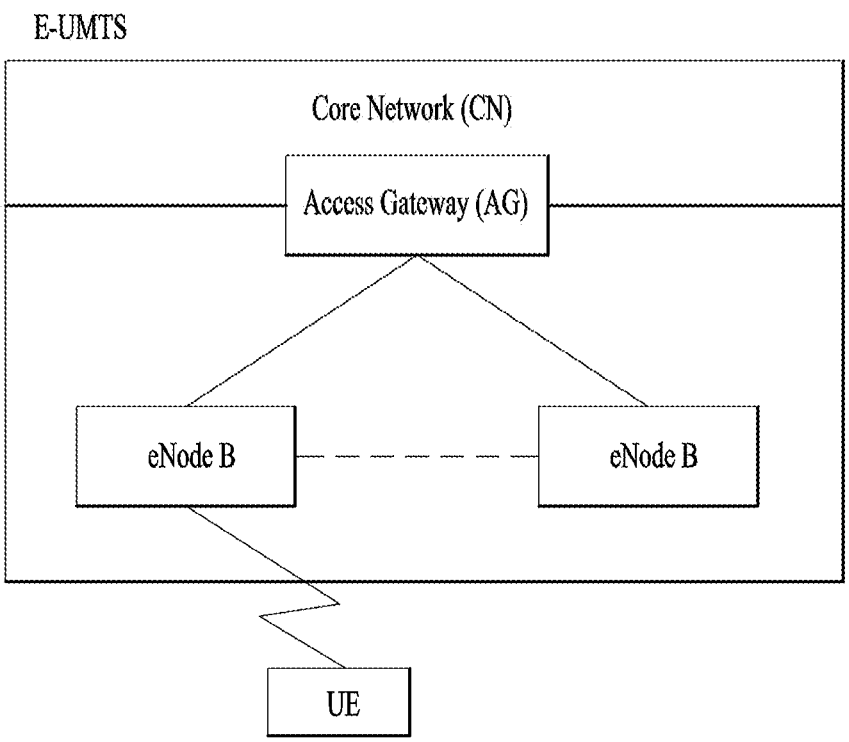
FIG. 1 is a diagram showing a network structure of an Evolved Universal Mobile Telecommunications System (E-UMTS) as an example of a wireless communication system.
Figure 2A:
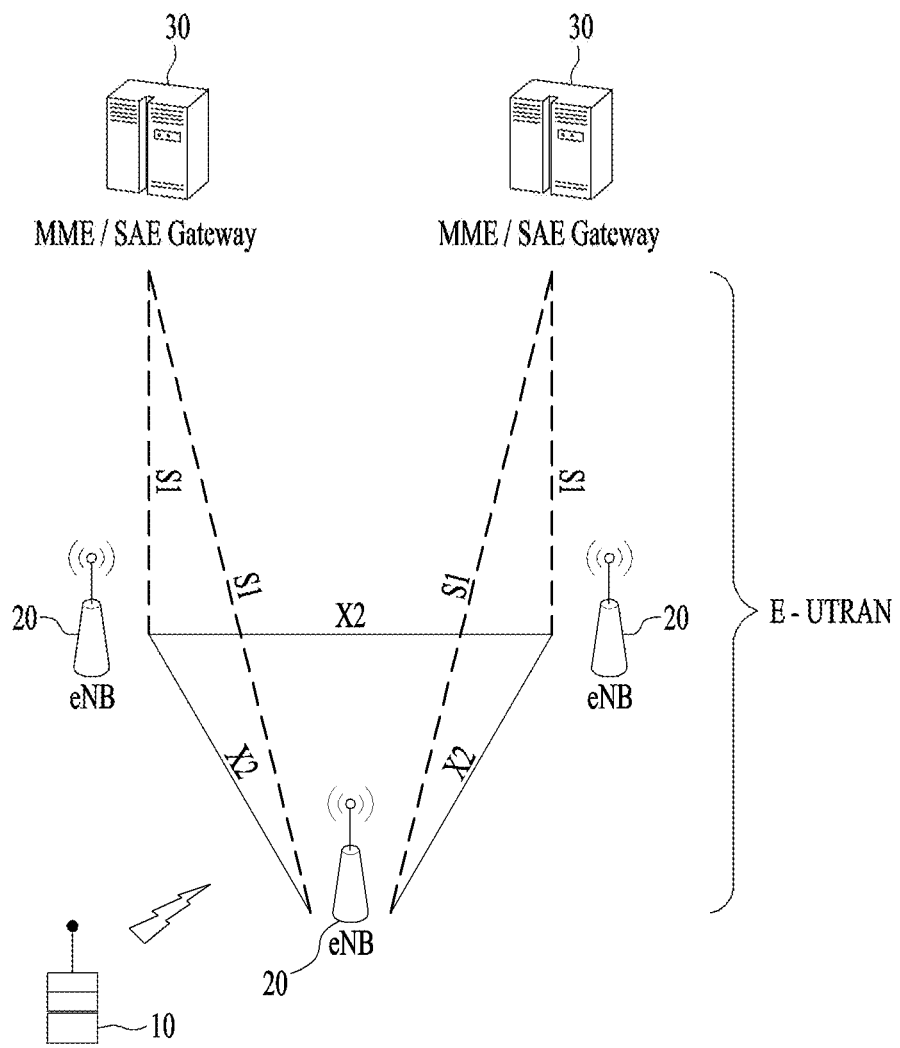
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
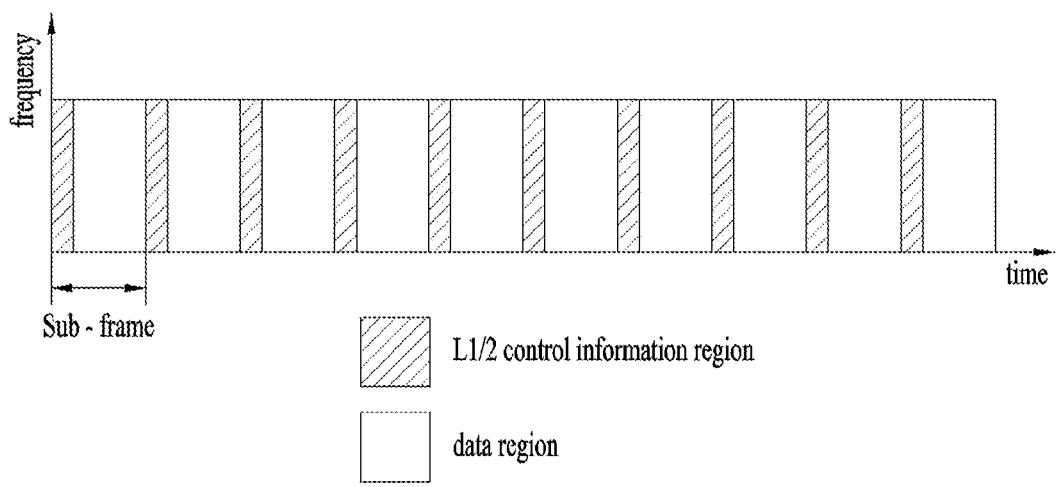
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
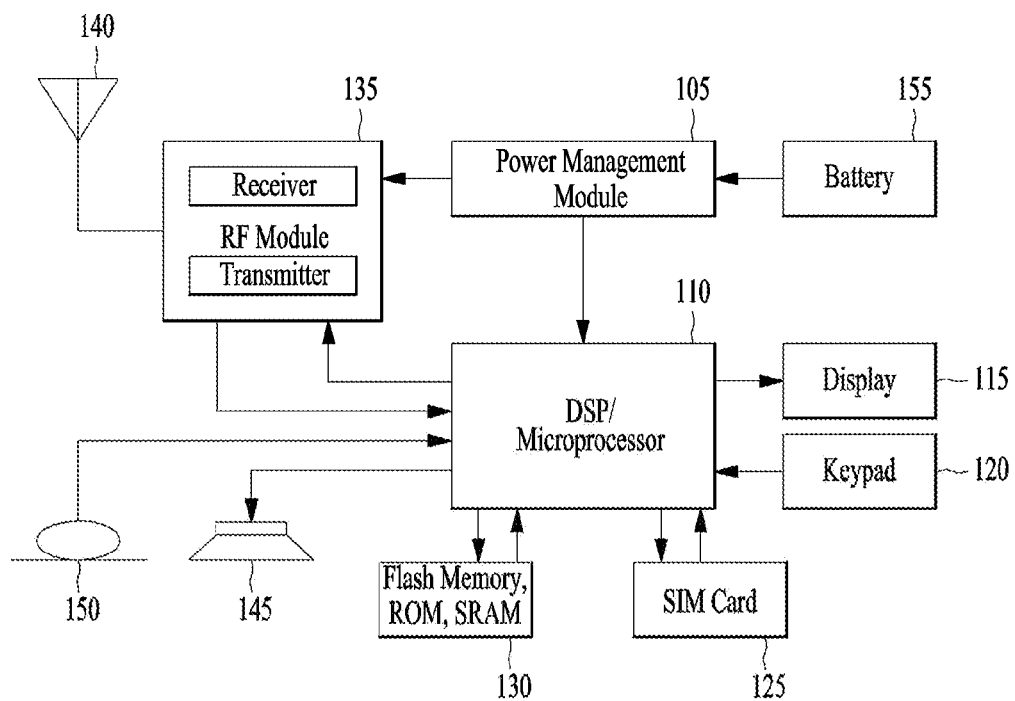
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
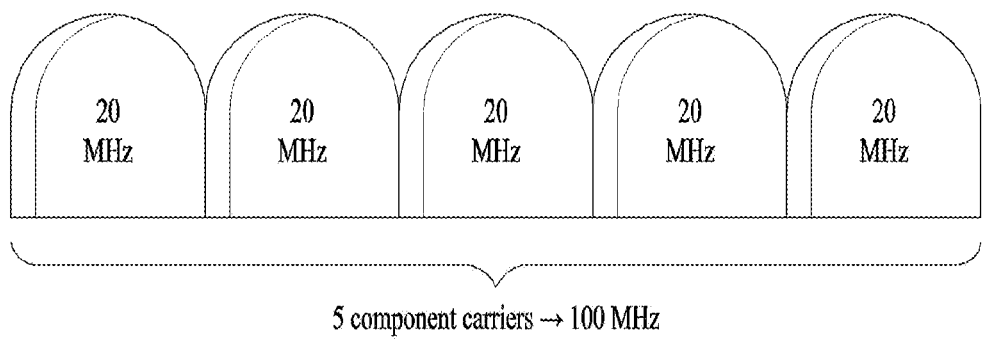
FIG. 6 is a diagram for carrier aggregation.

FIG. 6 is a diagram for carrier aggregation.

Carrier aggregation technology for supporting multiple carriers is described with reference to FIG. 6 as follows. As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

Multiple carriers (component carriers) used for carrier aggregation may be categorized into primary component carrier (PCC) and secondary component carrier (SCC). The PCC may be called PCell (primary cell) and the SCC may be called SCell (secondary cell). The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

Figure 7:
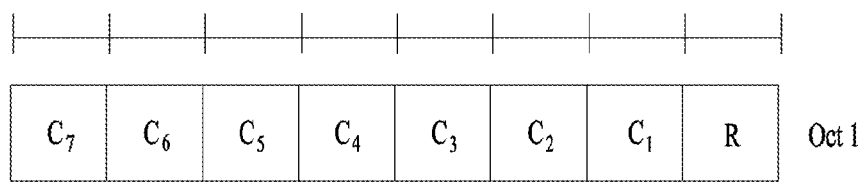
FIG. 7 is a diagram for an activation/deactivation MAC control element.

FIG. 7 is a diagram for an activation/deactivation MAC control element.

If the UE is configured with one or more SCells, the network may activate and deactivate the configured SCells. The PCell is always activated. The network activates and deactivates the SCell(s) by sending the Activation/Deactivation MAC control element. Furthermore, the UE maintains a sCellDeactivationTimer timer per configured SCell and deactivates the associated SCell upon its expiry. The same initial timer value applies to each instance of the sCellDeactivationTimer and it is configured by RRC. The configured SCells are initially deactivated upon addition and after a handover.

The UE configures each SCell to each TTI. If the UE receives an Activation/Deactivation MAC control element in this TTI activating the SCell, the UE may activate the SCell in the TTI. The UE can apply normal SCell operation including SRS transmissions on the SCell, CQI/PMI/RI/PTI reporting for the SCell, PDCCH monitoring on the SCell, or PDCCH monitoring for the SCell. Also the UE may start or restart the sCellDeactivationTimer associated with the SCell and trigger PHR.

If the UE receives an Activation/Deactivation MAC control element in this TTI deactivating the SCell, or if the sCellDeactivationTimer associated with the activated SCell expires in this TTI, the UE can deactivate the SCell in the TTI, stop the sCellDeactivationTimer associated with the SCell, and flush all HARQ buffers associated with the SCell.

If PDCCH on the activated SCell indicates an uplink grant or downlink assignment; or if PDCCH on the Serving Cell scheduling the activated SCell indicates an uplink grant or a downlink assignment for the activated SCell, the UE can restart the sCellDeactivationTimer associated with the SCell.

If the SCell is deactivated, the UE will not transmit SRS on the SCell, transmit on UL-SCH on the SCell, transmit on RACH on the SCell, monitor the PDCCH on the SCell, or monitor the PDCCH for the SCell.

HARQ feedback for the MAC PDU containing Activation/Deactivation MAC control element may not be impacted by PCell interruption due to SCell activation/deactivation.

The Activation/Deactivation MAC control element is identified by a MAC PDU subheader with LCID as specified in table 1. It has a fixed size and consists of a single octet containing seven C-fields and one R-field. The Activation/Deactivation MAC control element is defined as FIG. 7

TABLE 1

| Index | LCID values |
|---|---|
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

Ci field indicates the activation/deactivation status of the SCell with SCellIndex i, if there is an SCell configured with SCellIndex i. Else, the UE may ignore the Ci field. The Ci field is set to "1" to indicate that the SCell with SCellIndex i shall be activated. The Ci field is set to "0" to indicate that the SCell with SCellIndex i shall be deactivated.

R field is a reserved bit, and set to '0'.

Figure 8:
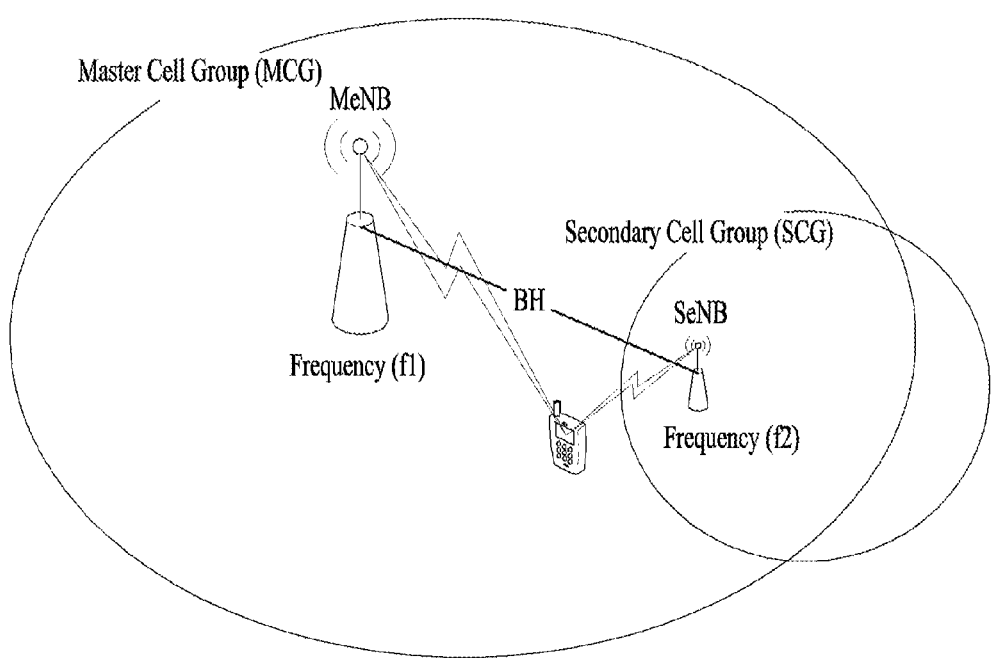
FIG. 8 is a conceptual diagram for dual connectivity (DC) between a Master Cell Group (MCS) and a Secondary Cell Group (SCG)

FIG. 8 is a conceptual diagram for dual connectivity (DC) between a Master Cell Group (MCS) and a Secondary Cell Group (SCG).

The dual connectivity means that the UE can be connected to both a Master eNode-B (MeNB) and a Secondary eNode-B (SeNB) at the same time. The MCG is a group of serving cells associated with the MeNB, comprising of a PCell and optionally one or more SCells. And the SCG is a group of serving cells associated with the SeNB, comprising of the special SCell and optionally one or more SCells. The MeNB is an eNB which terminates at least S1-MME (S1 for the control plane) and the SeNB is an eNB that is providing additional radio resources for the UE but is not the MeNB.

With dual connectivity, some of the data radio bearers (DRBs) can be offloaded to the SCG to provide high throughput while keeping scheduling radio bearers (SRBs) or other DRBs in the MCG to reduce the handover possibility. The MCG is operated by the MeNB via the frequency of f1, and the SCG is operated by the SeNB via the frequency of f2. The frequency f1 and f2 may be equal. The backhaul interface (BH) between the MeNB and the SeNB is non-ideal (e.g. X2 interface), which means that there is considerable delay in the backhaul and therefore the centralized scheduling in one node is not possible.

Figure 9A:
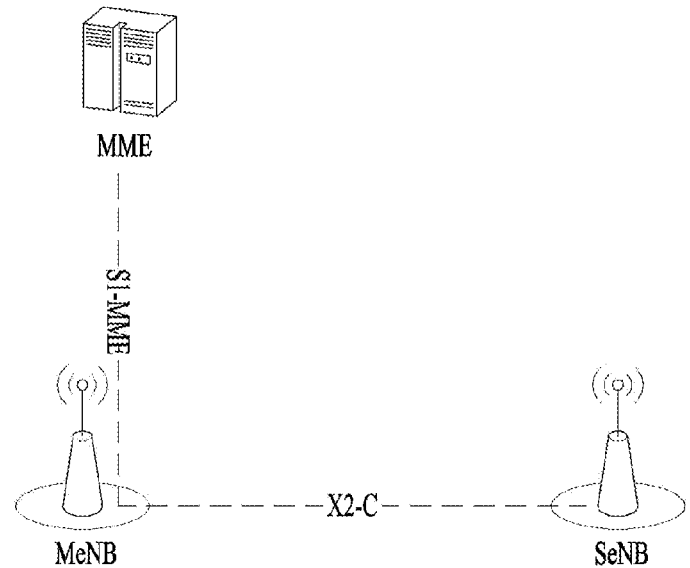
FIG. 9a is a conceptual diagram for C-Plane connectivity of base stations involved in dual connectivity.
Figure 9B:
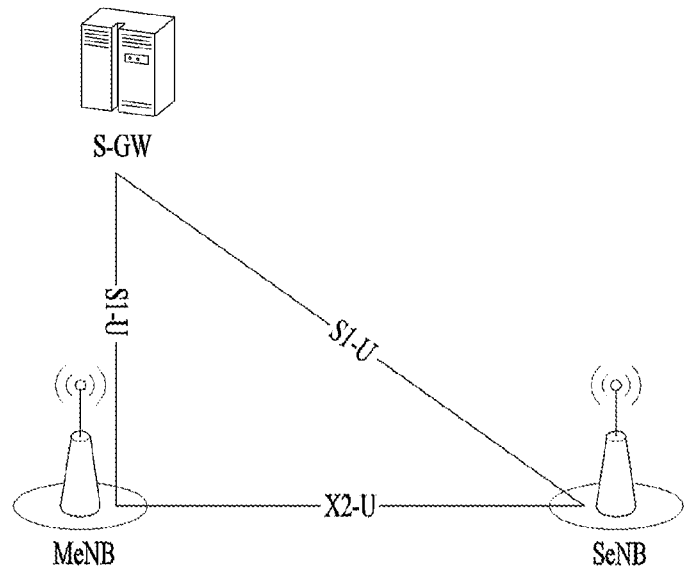
FIG. 9b is a conceptual diagram for U-Plane connectivity of base stations involved in dual connectivity.

FIG. 9a is a conceptual diagram for C-Plane connectivity of base stations involved in dual connectivity, and FIG. 9b is a conceptual diagram for U-Plane connectivity of base stations involved in dual connectivity.

FIG. 9a shows C-plane (Control Plane) connectivity of eNBs involved in dual connectivity for a certain UE: The MeNB is C-plane connected to the MME via S1-MME, the MeNB and the SeNB are interconnected via X2-C (X2-Control plane). As FIG. 9a, Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling.

FIG. 9b shows U-plane connectivity of eNBs involved in dual connectivity for a certain UE. U-plane connectivity depends on the bearer option configured: i) For MCG bearers, the MeNB is U-plane connected to the S-GW via S1-U, the SeNB is not involved in the transport of user plane data, ii) For split bearers, the MeNB is U-plane connected to the S-GW via S1-U and in addition, the MeNB and the SeNB are interconnected via X2-U, and iii) For SCG bearers, the SeNB is directly connected with the S-GW via S1-U. If only MCG and split bearers are configured, there is no S1-U termination in the SeNB. In the dual connectivity, enhancement of the small cell is required in order to data offloading from the group of macro cells to the group of small cells. Since the small cells can be deployed apart from the macro cells, multiple schedulers can be separately located in different nodes and operate independently from the UE point of view. This means that different scheduling node would encounter different radio resource environment, and hence, each scheduling node may have different scheduling results.

Figure 10:
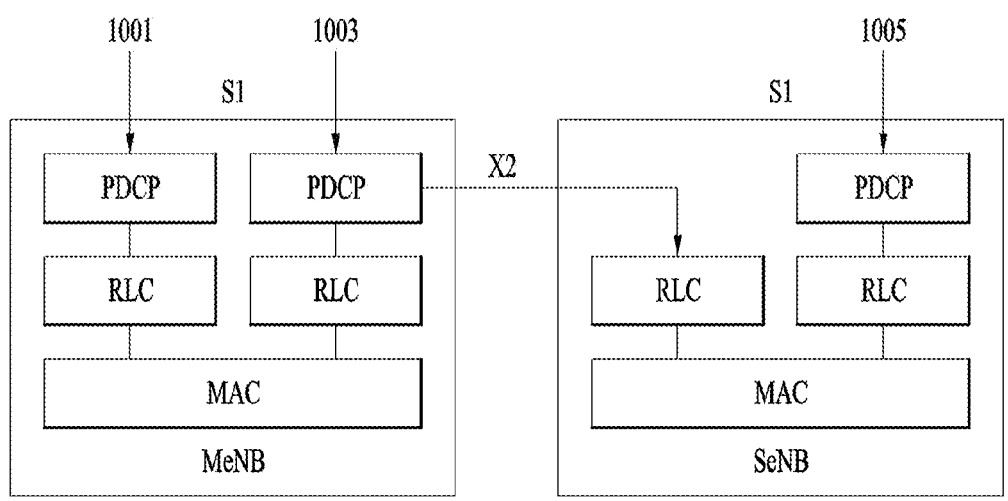
FIG. 10 is a conceptual diagram for radio protocol architecture for dual connectivity.

FIG. 10 is a conceptual diagram for radio protocol architecture for dual connectivity.

E-UTRAN of the present example can support dual connectivity operation whereby a multiple receptions/transmissions (RX/TX) UE in RRC_CONNECTED is configured to utilize radio resources provided by two distinct schedulers, located in two eNBs (or base stations) connected via a non-ideal backhaul over the X2 interface. The eNBs involved in dual connectivity for a certain UE may assume two different roles: an eNB may either act as the MeNB or as the SeNB. In dual connectivity, a UE can be connected to one MeNB and one SeNB.

In the dual connectivity operation, the radio protocol architecture that a particular bearer uses depends on how the bearer is setup. Three alternatives exist, MCG bearer (1001), split bearer (1003) and SCG bearer (1005). Those three alternatives are depicted on FIG. 10. The SRBs (Signaling Radio Bearers) are always of the MCG bearer and therefore only use the radio resources provided by the MeNB. The MCG bearer is a radio protocol only located in the MeNB to use MeNB resources only in the dual connectivity. And the SCG bearer is a radio protocol only located in the SeNB to use SeNB resources in the dual connectivity.

Specially, the split bearer is a radio protocol located in both the MeNB and the SeNB to use both MeNB and SeNB resources in the dual connectivity and the split bearer may be a radio bearer comprising one Packet Data Convergence Protocol (PDCP) entity, two Radio Link Control (RLC) entities and two Medium Access Control (MAC) entities for one direction. Specially, the dual connectivity operation can also be described as having at least one bearer configured to use radio resources provided by the SeNB.

Figure 11A:
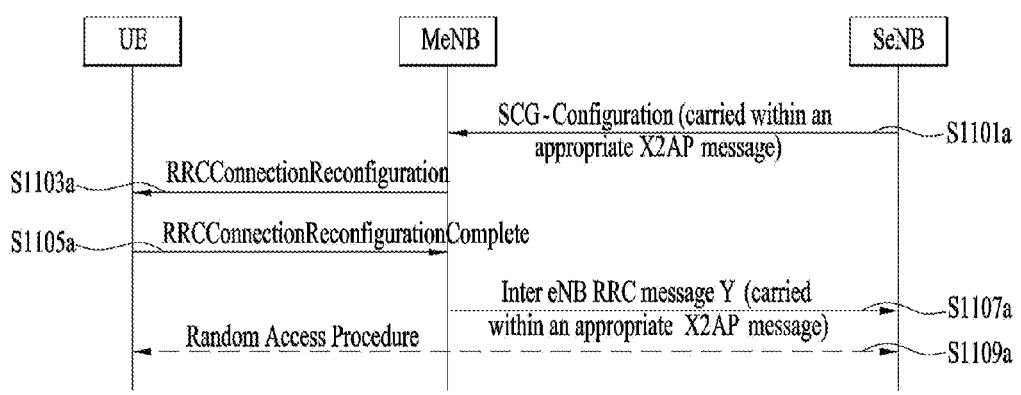
FIG. 11a is a diagram for SCG Modification procedure.
Figure 11B:
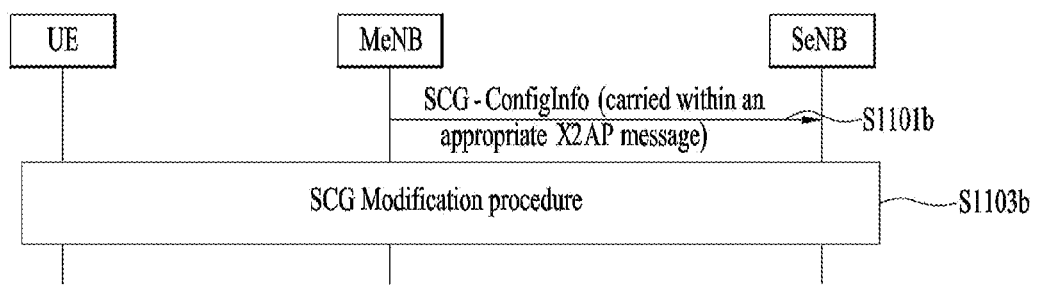
FIG. 11b is a diagram for SCG Addition/MeNB triggered SCG modification procedure.

FIG. 11a is a diagram for SCG Modification procedure, and FIG. 11b is a diagram for SCG Addition/MeNB triggered SCG modification procedure.

1. SCG Modification

The SCG modification procedure is initiated by the SeNB and used to perform configuration changes of the SCG within the same SeNB. FIG. 11a shows the SCG Modification procedure.

Regarding FIG. 11a, the SeNB requests SCG modification by providing the new radio resource configuration of SCG in the SCG-Configuration carried by an appropriate X2AP message (S1101a).

If MeNB accepts the SeNB request, the MeNB sends the RRCConnectionReconfiguration message to the UE including the new radio resource configuration of SCG according to the SCG-Configuration (S1103a).

The UE applies the new configuration and reply the RRCConnectionReconfigurationComplete message. If synchronisation towards the SeNB is not required for the new configuration, the UE may perform UL transmission after having applied the new configuration (S1105a). The MeNB replies the SCG Modification Response to the SeNB forwarding the Inter-eNB-RRC-message-Y message with an appropriate X2AP message (S1107a)

If the new configuration requires synchronisation towards the SeNB, the UE performs the Random Access procedure (S1109a).

In case the UE is unable to comply with (part of) the configuration included in the RRCConnectionReconfiguration message, it performs the reconfiguration failure procedure.

The order the UE sends the RRCConnectionReconfigurationComplete message and performs the Random Access procedure towards the SCG is not defined. The successful RA procedure towards the SCG is not required for a successful completion of the RRCConnectionReconfiguration procedure.

PSCell in SCG can be changed with the SCG Modification procedure. The SeNB can decide whether the Random Access procedure is required, e.g., depending on whether the old PSCell and new PSCell belongs to the same TAG.

The SeNB can use the SCG modification procedure to trigger release of SCG SCell(s) other than PSCell, and the MeNB cannot reject. However, the SeNB cannot use this procedure to trigger addition of an SCG SCell i.e. SCG SCell addition is always initiated by MeNB.

The SeNB can trigger the release of an SCG bearer or the SCG part of a split bearer, upon which the MeNB may release the bearer or reconfigure it to an MCG bearer. Details are FFS e.g. whether the SeNB may immediately trigger release or whether SeNB sends a trigger to the MeNB followed by a MeNB triggered SCG modification.

2. SCG Addition/MeNB Triggered SCG Modification.

The SCG addition procedure is initiated by the MeNB and used to add the first cell of the SCG. The MeNB triggered SCG modification procedure is initiated by the MeNB. In FIG. 11b shows the SCG Addition/MeNB triggered SCG modification procedure. The MeNB can use the procedure to initiate addition or release of SCG cells and of SCG bearer or split bearer on SCG. For all SCG modifications other than release of the entire SCG, the SeNB generates the signalling towards the UE. The MeNB can request to add particular cells to the SeNB, and the SeNB may reject. With the modification procedure, the MeNB can trigger the release of SCG SCell(s) other than PSCell, and in this case the SeNB cannot reject.

The MeNB sends within an appropriate X2AP message the SCG-ConfigInfo which contains the MCG configuration and the entire UE capabilities for UE capability coordination to be used as basis for the reconfiguration by the SeNB. In case of SCG addition and SCG SCell addition request, the MeNB can provide the latest measurement results for the SCG cell(s) requested to be added and SCG serving cell(s). The SeNB may reject the request (S1101b).

If the SeNB accepts the MeNB request, the SeNB initiates the SCG Modification procedure (S1103b)

3. SCG Change

The SCG change procedure is used to change configured SCG from one SeNB to another (or the same SeNB) in the UE. Towards target SeNB, the MeNB triggered SCG modification procedure. MeNB indicates in the RRCConnectionReconfiguration message towards the UE that the UE releases the old SCG configuration and adds the new SCG configuration. For the case of SCG change in the same SeNB, the path switch may be suppressed.

4. SCG Release

The SCG release procedure is used to release the CG in an SeNB. The SCG release procedure is realized by a specific X2 AP procedure not involving the transfer of an inter-eNB RRC message. The MeNB may request the SeNB to release the SCG, and vice versa. The recipient node of this request cannot reject. Consequently, the MeNB indicates in the RRCConnectionReconfiguration message towards the UE that the UE shall release the entire SCG configuration.

5. SCG Release During Handover Between MeNB and eNB

Upon handover involving change of MeNB, the source MeNB includes the SCG configuration in the Handover-PreparationInformation. The source MeNB initiates the release towards the SeNB and the target eNB prepares RRCConnectionReconfiguration message including mobilityControlInformation which triggers handover and generates/includes a field indicating the UE shall release the entire SCG configuration.

For intra-MeNB HO, the MeNB may indicate SCG change in RRCConnectionReconfiguration message including mobilityControlInformation. It is however assumed that upon inter-eNB handover, addition of an SCG can be initiated only after completing handover. The UE is not aware whether the handover is an intra- or inter-MeNB HO.

6. SeNB UE Information

The SeNB may provide information to MeNB regarding a particular UE and the MeNB may use this information to e.g. initiate release of SCG bearer or split bearer on SCG.

Figure 12A:
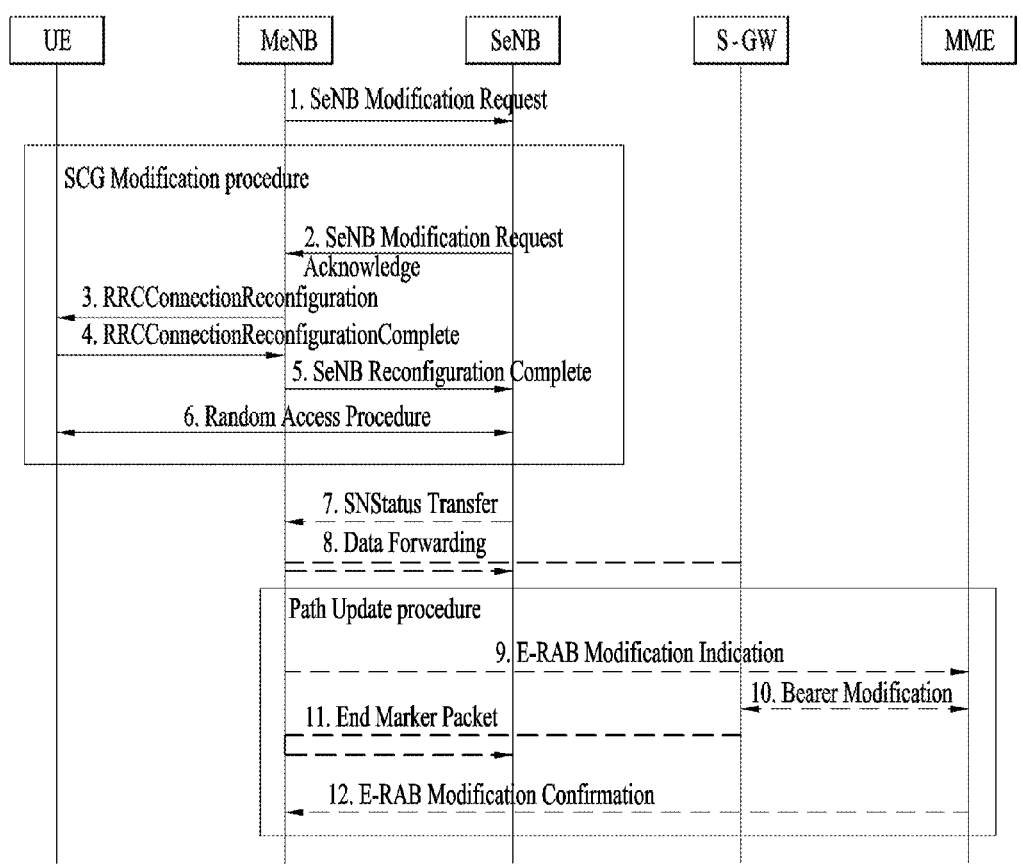
FIG. 12a is a diagram for SeNB Addition procedure.
Figure 12B:
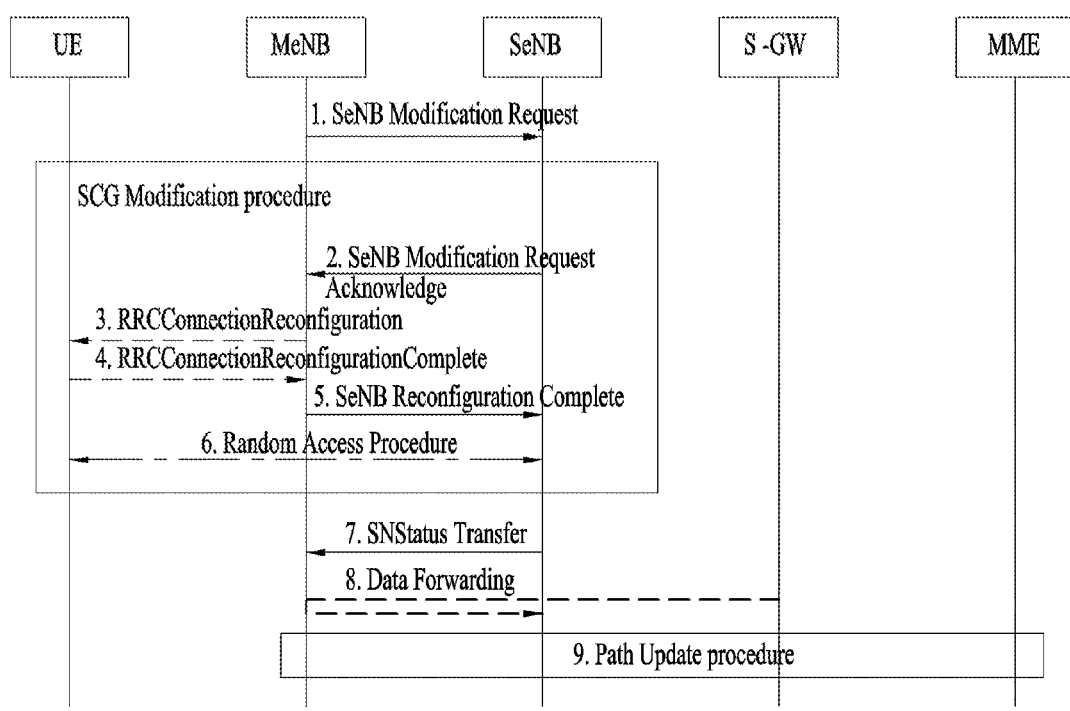
FIG. 12b is a diagram for SeNB Modification procedure—MeNB initiated.
Figure 12C:
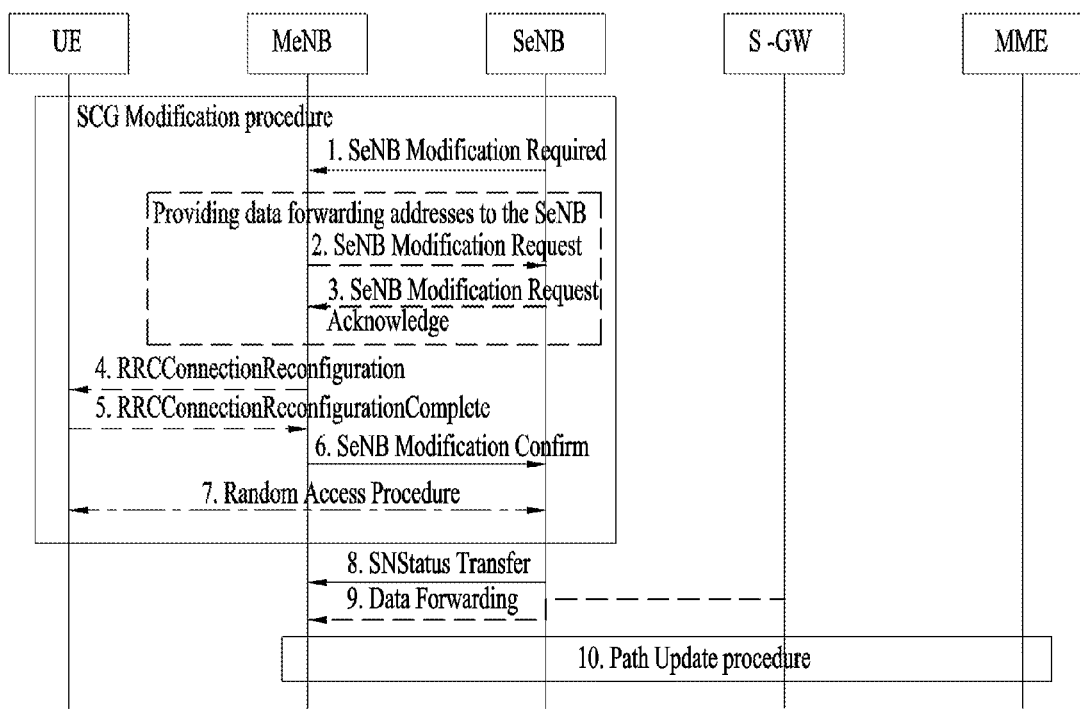
FIG. 12c is a diagram for SeNB Modification procedure—SeNB initiated.
Figure 12D:
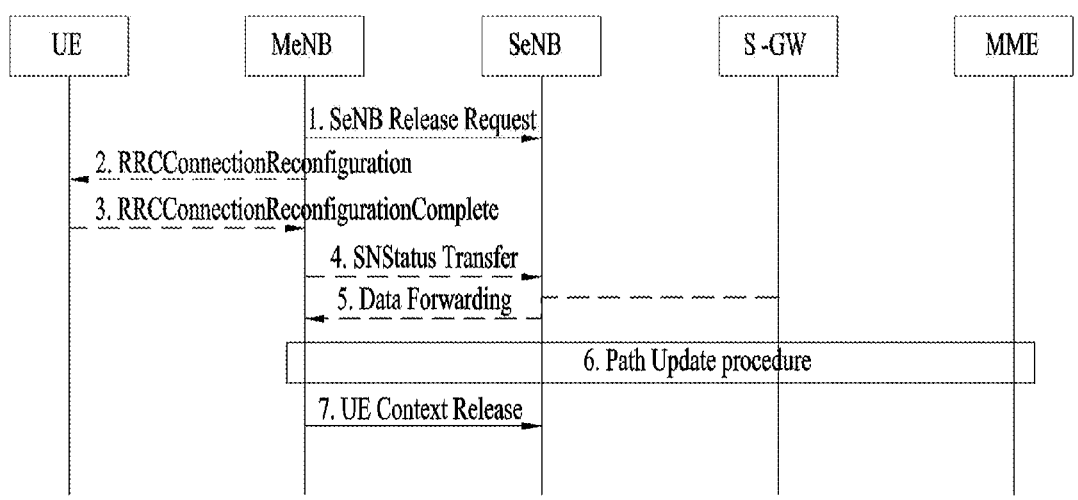
FIG. 12d is a diagram for SeNB Release procedure—MeNB initiated.
Figure 12E:
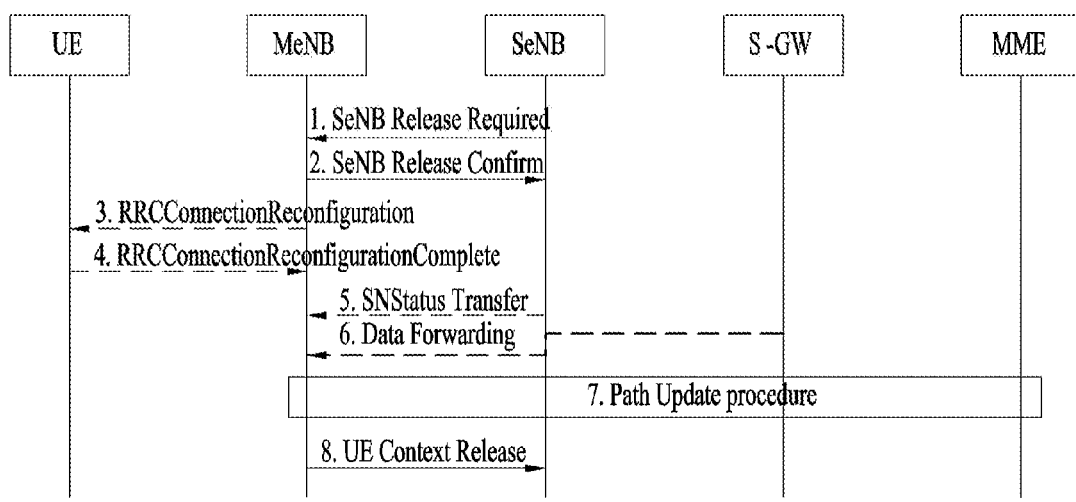
FIG. 12e is a diagram for SeNB Release procedure—SeNB initiated.
Figure 12F:
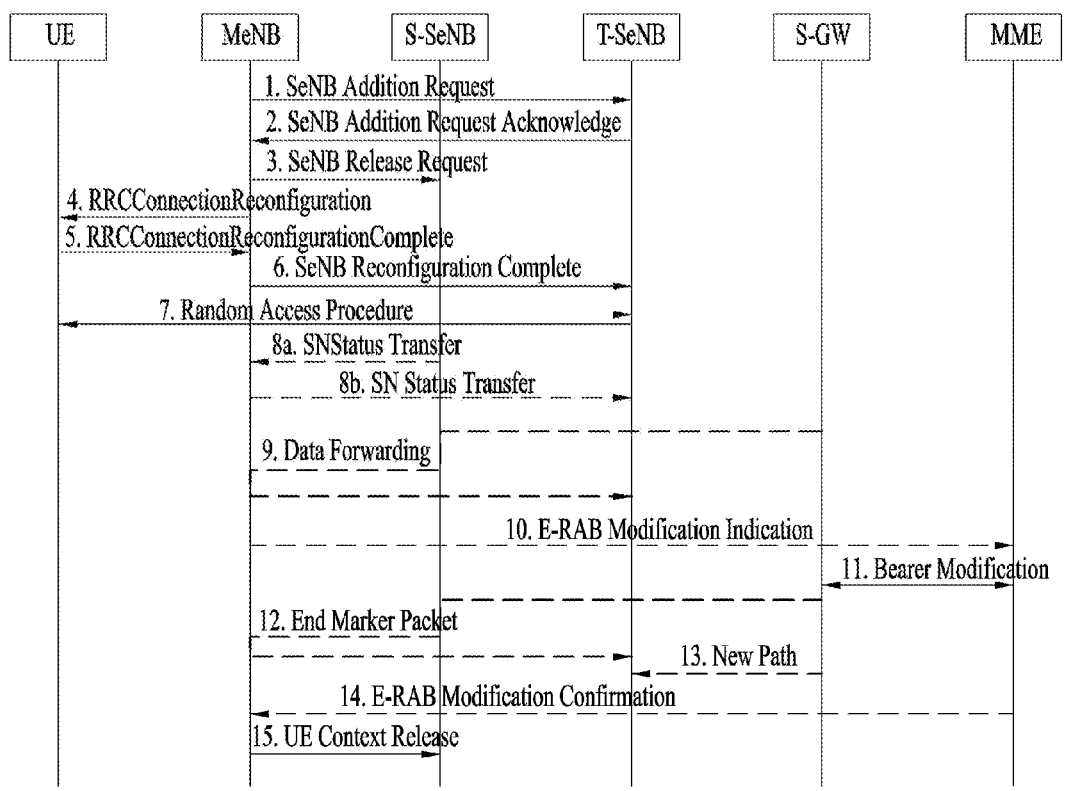
FIG. 12f is a diagram for SeNB Change procedure.
Figure 12G:
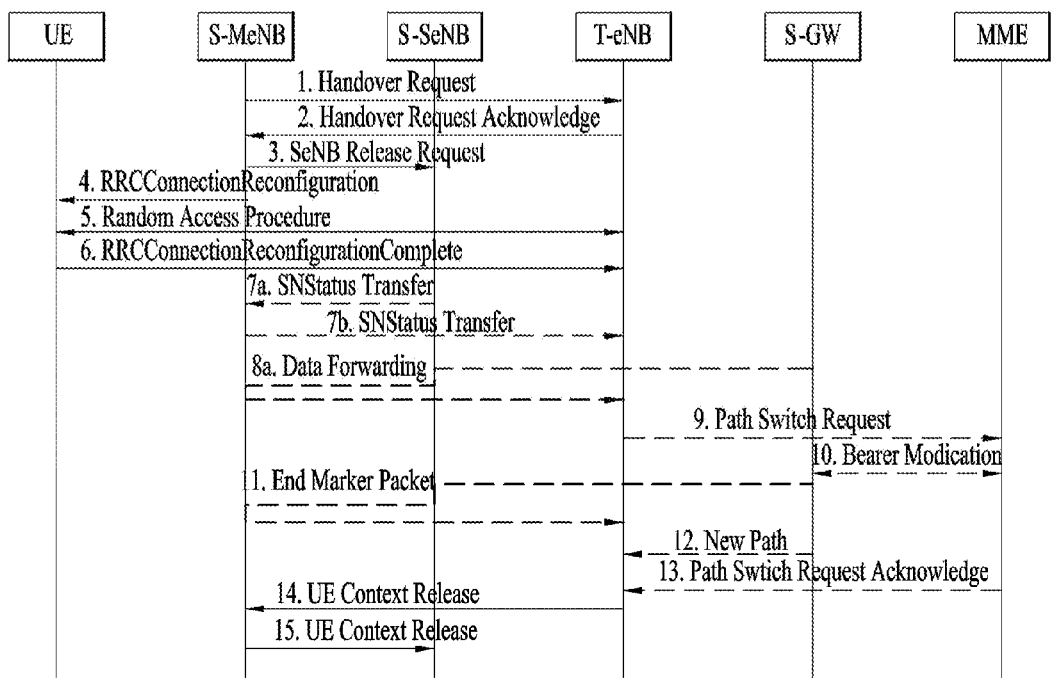
FIG. 12g is a diagram for MeNB to eNB Change procedure.

FIG. 12a is a diagram for SeNB Addition procedure, FIG. 12b is a diagram for SeNB Modification procedure—MeNB initiated, FIG. 12c is a diagram for SeNB Modification procedure—SeNB initiated, FIG. 12d is a diagram for SeNB Release procedure—MeNB initiated, FIG. 12e is a diagram for SeNB Release procedure—SeNB initiated, FIG. 12f is a diagram for SeNB Change procedure, and FIG. 12g is a diagram for MeNB to eNB Change procedure.

FIG. 12a is a diagram for SeNB Addition procedure. The SeNB Addition procedure is initiated by the MeNB and is used to establish a UE context at the SeNB in order to provide radio resources from the SeNB to the UE.

The MeNB decides to request the SeNB to allocate radio resources for a specific E-RAB, indicating E-RAB characteristics (1). In contrast to SCG bearer, for the split bearer option the MeNB may either decide to request resources from the SeNB of such an amount, that the QoS for the respective E-RAB is guaranteed by the exact sum of resources provided by the MeNB and the SeNB together, or even more. The MeNBs decision may be reflected in step 2 by the E-RAB parameters signalled to the SeNB, which may differ from E-RAB parameters received over S1.

If the RRM entity in the SeNB is able to admit the resource request, it allocates respective radio resources and, dependent on the bearer option, respective transport network resources (2). The SeNB may trigger Random Access so that synchronisation of the SeNB radio resource configuration can be performed. The SeNB provides the new radio resource configuration to the MeNB. For SCG bearers, together with S1 DL TNL address information for the respective E-RAB, for split bearers X2 DL TNL address information.

If the MeNB endorses the new configuration, it triggers the UE to apply it. The UE starts to apply the new configuration (3). And the UE completes the reconfiguration procedure (4). The MeNB informs the SeNB that the UE has completed the reconfiguration procedure successfully (5). The UE performs synchronisation towards the cell of the SeNB (6).

In case SCG bearers, and dependent on the bearer characteristics of the respective E-RAB, the MeNB may take actions to minimise service interruption due to activation of dual connectivity (7~8). For SCG bearers, the update of the UP path towards the EPC is performed (9~10).

FIG. 12b is a diagram for SeNB Modification procedure—MeNB initiated and FIG. 12c is a diagram for SeNB Modification procedure—SeNB initiated.

The SeNB Modification procedure may be either initiated by the MeNB or by the SeNB. It may be used to modify, establish or release bearer contexts, to transfer bearer contexts to and from the SeNB or to modify other properties of the UE context at the SeNB. It does not necessarily need to involve signaling towards the UE.

Regarding FIG. 12b, the MeNB sends the SeNB Modification Request message, which may contain bearer context related or other UE context related information, and, if applicable data forwarding address information (1). The SeNB responds with the SeNB Modification Request Acknowledge message, which may contain radio configuration information, and, if applicable, data forwarding address information (2). The MeNB initiates the RRC connection reconfiguration procedure (3~4). Success of the RRC connection reconfiguration procedure is indicated in the SeNB Reconfiguration Complete message (5). The UE performs synchronisation towards the cell of the SeNB (6). If the bearer context at the SeNB is configured with the SCG bearer option and, if applicable. Data forwarding between MeNB and the SeNB takes place. (7~8). And if applicable, a path update is performed (9).

Regarding FIG. 12c, the SeNB sends the SeNB Modification Required message, which may contain bearer context related or other UE context related information (1).

If the bearer context at the SeNB is configured with the SCG bearer option and, if data forwarding needs to be applied, the MeNB triggers the preparation of the MeNB initiated SeNB Modification procedure and provides forwarding address information within the SeNB Modification Request message (2~3). The MeNB initiates the RRC connection reconfiguration procedure (4~5). Success of the RRC connection reconfiguration procedure is indicated in the SeNB Modification Confirm message (6). The UE performs synchronisation towards the cell of the SeNB (7). Data forwarding between MeNB and the SeNB takes place (8~9), and if applicable, a path update is performed (10).

FIG. 12d is a diagram for SeNB Release procedure—MeNB initiated, and FIG. 12e is a diagram for SeNB Release procedure—SeNB initiated.

The SeNB Release procedure may be either initiated by the MeNB or by the SeNB. It is used to release the UE context at the SeNB. It does not necessarily need to involve signaling towards the UE.

Regarding FIG. 12d, the MeNB initiates the procedure by sending the SeNB Release Request message (1). If a bearer context in the SeNB was configured with the SCG bearer option and is moved to e.g. the MeNB, the MeNB provides data forwarding addresses to the SeNB. The SeNB may start data forwarding and stop providing user data to the UE as early as it receives the SeNB Release Request message. The MeNB initiates the RRC connection reconfiguration procedure (2~3). Data forwarding from the SeNB to the MeNB takes place (4~5), and if applicable, the path update procedure is initiated (6). Upon reception of the UE CONTEXT RELEASE message, the SeNB can release radio and C-plane related resource associated to the UE context (7).

Regarding FIG. 12e, the SeNB initiates the procedure by sending the SeNB Release Required message which does not contain inter-node message (1). If a bearer context in the SeNB was configured with the SCG bearer option and is moved to e.g. the MeNB, the MeNB provides data forwarding addresses to the SeNB in the SeNB Release Confirm message (2). The SeNB may start data forwarding and stop providing user data to the UE as early as it receives the SeNB Release Confirm message. The MeNB initiates the RRC connection reconfiguration procedure (3~4). Data forwarding from the SeNB to the MeNB takes place (5~6) and if applicable, the path update procedure is initiated (7). Upon reception of the UE CONTEXT RELEASE message, the SeNB can release radio and C-plane related resource associated to the UE context. Any ongoing data forwarding may continue (8).

FIG. 12f is a diagram for SeNB Change procedure.

The SeNB Change procedure provides the means to transfer a UE context from a source SeNB to a target SeNB.

The MeNB initiates the SeNB Change procedure by requesting the target SeNB to allocate resources for the UE by means of the SeNB Addition Preparation procedure (1~2). If forwarding is needed, the target SeNB provides forwarding addresses to the MeNB.

If the allocation of target SeNB resources was successful, the MeNB initiates the release of the source SeNB resources towards the UE and Source SeNB (3). If data forwarding is needed the MeNB provides data forwarding addresses to the source SeNB. Either direct data forwarding or indirect data forwarding is used. Reception of the SeNB Release Request message triggers the source SeNB to stop providing user data to the UE and, if applicable, to start data forwarding. The MeNB triggers the UE to apply the new configuration (4~5). If the RRC connection reconfiguration procedure was successful, the MeNB informs the target SeNB (6). The UE synchronizes to the target SeNB (7). Data forwarding from the source SeNB takes place for E-RABs configured with the SCG bearer option. It may be initiated as early as the source SeNB receives the SeNB Release Request message from the MeNB (8~9). If one of the bearer contexts was configured with the SCG bearer option at the source SeNB, path update is triggered by the MeNB (10~14). Upon reception of the UE CONTEXT RELEASE message, the S-SeNB can release radio and C-plane related resource associated to the UE context. Any ongoing data forwarding may continue (15).

FIG. 12g is a diagram for MeNB to eNB Change procedure.

The source MeNB starts the MeNB to eNB Change procedure by initiating the X2 Handover Preparation procedure (1~2). The target eNB may provide forwarding addresses to the source MeNB. If the allocation of target eNB resources was successful, the MeNB initiates the release of the source SeNB resources towards the source SeNB (3). If the MeNB received forwarding addresses and a bearer context in the source SeNB was configured with the SCG bearer option and data forwarding is needed the MeNB provides data forwarding addresses to the source SeNB. Either direct data forwarding or indirect data forwarding is used. Reception of the SeNB Release Request message triggers the source SeNB to stop providing user data to the UE and, if applicable, to start data forwarding. The MeNB triggers the UE to apply the new configuration (4). The UE synchronizes to the target eNB (5~6). Data forwarding from the SeNB takes place for E-RABs configured with the SCG bearer option (7~8). It may start as early as the source SeNB receives the SeNB Release Request message from the MeNB. The target eNB initiates the S1 Path Switch procedure (9~13). The target eNB initiates the UE Context Release procedure towards the source MeNB (14). Upon reception of the UE CONTEXT RELEASE message, the S-SeNB can release radio and C-plane related resource associated to the UE context. Any ongoing data forwarding may continue (15).

FIG. 13 is a diagram for PSCell change procedure for Dual Connectivity.

For CA, a PCell always changes by means of the handover procedure, i.e., with key change and RACH. In detail, during handover procedure, the PCell is released and added while the SCells are deactivated.

For DC, although a PSCell supports some of the PCell functionalities, the PSCell is conceptually different from the PCell because the PSCell is configured only after the RRC connection is established.

Regarding FIG. 13, Scenario 1 indicates that PSCell changes to the same cell in the same SeNB. This is due to security key refresh/rekeying. During PSCell change, if PSCell changes to the same PSCell, all SCG cells including PSCell are released.

Scenario 2 indicates PSCell changes to a different configured cell in the same SeNB. This is mainly due to load balancing or RRM decision.

The Cell 1 is an old PSCell which is not the PSCell anymore. In order to modify the old PSCell to an SCG SCell, either 'Reconfiguration' or 'Release and Addition' can be used. In 'Reconfiguration', only the changed configuration of SCG will be transmitted while keeping the old PSCell as configured. In 'Release and Addition', the old PSCell will be released and added as an SCG SCell as deactivated. From RRC point of view, 'Reconfiguration' is efficient and fast because only the changed part of SCG configuration will be transmitted while 'Release and Addition' brings an additional signaling in order to send whole SCG configuration even though some part do not change.

From MAC point of view, 'Release and Addition' is simple while 'Reconfiguration' has some MAC impacts such as follows:

Activation/Deactivation of old PSCell and other SCG SCells

Handling of old primary sTAG

Handling of on-going data transmission during Reconfiguration

During PSCell change, the old PSCell which is not the new PSCell anymore can be kept as an SCG SCell only by 'Release and Addition'.

The Cell 2 is a new PSCell if the new PSCell is an already configured cell. If the new PSCell is an already configured SCG SCell in the same SeNB, the new PSCell can be configured either by 'Reconfiguration' or 'Release and Addition' of the SCG SCell. In 'Reconfiguration', only the changed configuration of SCG will be transmitted in order to promote an SCG SCell to the new PSCell. In 'Release and Addition', the SCG SCell will be released and added again as a new PSCell.

From RRC point of view, 'Reconfiguration' is efficient and fast while 'Release and Addition' brings some signaling overhead as explained in Cell 1 case. On the other hand, from MAC point of view, 'Reconfiguration' has an impact on MAC, e.g. handling of new primary sTAG while 'Release and Addition' can be easily achieved. Thus, during PSCell change, a configured SCG SCell can be configured as the new PSCell by means of 'Release and Addition', too.

Scenario 3 indicates that PSCell changes to a new cell in the same SeNB.

The Cell 1 is an old PSCell which is not the PSCell anymore, and Cell 3 is one of SCG SCells which are neither the old PSCell nor the new PSCell.

The Cell 1 of Scenario 3 has same treatment as the cell 1 of Scenario 2.

In case of Cell 3, in order to keep the SCG SCells, there are two options, either 'No reconfiguration' or 'Release and Addition'. In 'No reconfiguration', the SCG SCells are kept without any configuration change. However, RAN2 need to discuss how to handle the Activation/Deactivation status of the SCG SCells during PSCell change. In 'Release and Addition', all SCG SCells are released and added again as deactivated. 'No reconfiguration' could be similar to the current handling of SCells during PCell change in CA, i.e., to deactivate SCells while keep them configured. On the other hand, 'Release and Addition' is simple and has commonality with handling of new/old PSCell within PSCell change in DC. Thus, during PSCell change, an SCG SCell can be kept only by means of 'Release and Addition'.

Scenario 4 indicates that PSCell changes to a cell in the different SeNB. This is mainly due to RRM decision and the PSCell change between the different SeNBs is realized by SeNB change procedure. Accordingly, it is straightforward to release all SCG cells including the PSCell and SCG SCells in the old SeNB.

In case the new PSCell is either a cell not configured in the same SeNB or a cell in the different SeNB, it is straightforward to configure the new PSCell by means of 'Addition'.

Figure 14:
FIG. 14 is a diagram for transmitting RRCConnectionReconfiguration message from E-UTRAN and to UE.

FIG. 14 is a diagram for transmitting RRCConnectionReconfiguration message from E-UTRAN and to UE.

If the RRCConnectionReconfiguration message does not include the mobilityControlInfo and the UE is able to comply with the configuration included in this message, if this is the first RRCConnectionReconfiguration message after successful completion of the RRC Connection Re-establishment procedure, the UE may re-establish PDCP for SRB2 and for all DRBs that are established, if any, or re-establish RLC for SRB2 and for all DRBs that are established, if any, or perform the radio configuration procedure if the RRCConnectionReconfiguration message includes the fullConfig, or perform the radio resource configuration procedure if the RRCConnectionReconfiguration message includes the radioResourceConfigDedicated, or resume SRB2 and all DRBs that are suspended, if any.

If the RRCConnectionReconfiguration message includes the radioResourceConfigDedicated, the UE may perform the radio resource configuration procedure.

If the received RRCConnectionReconfiguration includes the sCellToReleaseList, the UE may perform SCell release. And if the received RRCConnectionReconfiguration includes the sCellToAddModList, the UE may perform SCell addition or modification. If the received RRCConnectionReconfiguration includes the systemInformationBlockType1Dedicated, the UE may perform the actions upon reception of the SystemInformationBlockType1 message. If the RRCConnectionReconfiguration message includes the dedicatedInfoNASList, the UE may forward each element of the dedicatedInfoNASList to upper layers in the same order as listed. If the RRCConnectionReconfiguration message includes the measConfig, the UE may perform the measurement configuration procedure. If the RRCConnectionReconfiguration message includes the otherConfig, the UE may perform the other configuration procedure.

The UE may submit the RRCConnectionReconfigurationComplete message to lower layers for transmission using the new configuration, upon which the procedure ends.

Meanwhile, if the RRCConnectionReconfiguration message includes the mobilityControlInfo and the UE is able to comply with the configuration included in this message, the UE may stop timer T310, if running, stop timer T312, if running, start timer T304 with the timer value set to t304, as included in the mobilityControlInfo, or the UE may consider the target PCell to be one on the frequency indicated by the carrierFreq with a physical cell identity indicated by the targetPhysCellId, if the carrierFreq is included.

Also, if the RRCConnectionReconfiguration message includes the mobilityControlInfo and the UE is able to comply with the configuration included in this message, the UE may the UE may start synchronising to the DL of the target PCell, reset MAC, re-establish PDCP for all RBs that are established, re-establish RLC for all RBs that are established, configure lower layers to consider the SCell(s), if configured, to be in deactivated state, apply the value of the newUE-Identity as the C-RNTI.

Figure 15:
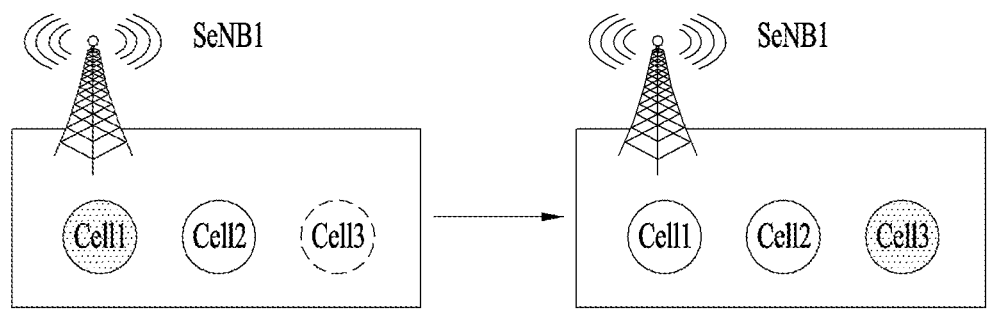
FIG. 15 is an example of PSCell change in a same SeNB without receiving RRCConnectionReconfiguration including the mobilityControlInfo.

FIG. 15 is an example of PSCell change in a same SeNB without receiving RRCConnectionReconfiguration including the mobilityControlInfo.

In CA, during handover procedure, all SCells are considered to be deactivated. In detail, when the UE receives a RRCConnectionReconfiguration including the mobilityControlInfo, the UE considers all the configured SCells to be in deactivated state. The handover procedure is used for PCell change due to, e.g., security key refresh/rekeying and RRM decision by the network. This implies that when PCell changes, all SCells are considered to be deactivated.

In DC, a PSCell (primary SCell) can change due to load balancing or RRM decision. FIG. 15 is an example of PSCell change in the SeNB is presented. In this example, the PSCell for SeNB1 changes from Cell 1 to Cell 3.

In this case, UE might not receive a RRCConnectionReconfiguration including the mobilityControlInfo because the PCell does not change. Then, the UE keeps the state of SCG SCells (Cell 2 in the example) as it is unless the network explicitly deactivates the SCG SCells by transmitting the Activation/Deactivation MAC CE which deactivates the SCG SCells. If an SCG SCell is activated during PSCell change, the UE is still able to perform CQI/PMI/RI PTI report, UL transmission, RACH or monitoring PDCCH on that SCG SCell, which might not work properly due to PSCell change procedure. In order to avoid inefficient MAC operation during PSCell change, a new mechanism to deactivate the SCG SCell during PSCell change is needed.

Figure 16:
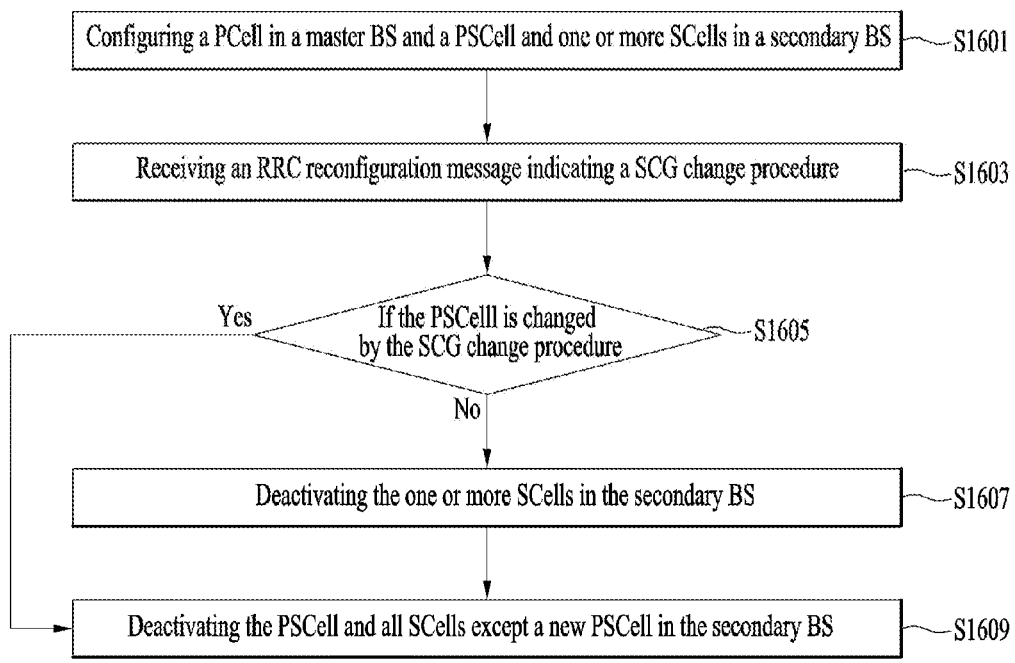
FIG. 16 is a conceptual diagram for deactivating of SCG SCells during SCG change procedure according to embodiments of the present invention.

FIG. 16 is a conceptual diagram for deactivating of SCG SCells during SCG change procedure according to embodiments of the present invention.

In this invention, a UE, configured with dual connectivity, autonomously deactivates the configured SCG (Secondary Cell Group) SCells during PSCell change. In detail, when the UE receives a RRC signaling that changes a PSCell in an SeNB (Secondary eNB) while maintaining the PCell of MeNB (Master eNB), the UE deactivates the configured SCG SCells in the SeNB of which PSCell changes. In order to change a PSCell in the SeNB, the UE may receive a RRC signaling from the network that releases the current PSCell and configures a new PSCell for the SeNB.

The UE is connected to one MeNB and at least one SeNB, where the UE is configured with MCG SCells and PCell for the MeNB, and with SCG SCells and PSCell for each SeNB (S1601).

The UE receives a RRC reconfiguration message indicating a PSCell change procedure while maintaining a connection with the MeNB (S1603).

The PSCell Change procedure comprises: i) PSCell changes to the same cell in the same SeNB, ii) PSCell changes to a different configured cell in the same SeNB, iii) PSCell changes to a new cell in the same SeNB; and iv) PSCell changes to a cell in the different SeNB.

The RRC reconfiguration message includes at least one of i) an indication of the new PSCell; ii) an indication of changing from the PSCell to the new PSCell; iii) an indication of releasing of the PSCell and addition of the new PSCell; iv) an indication of addition off the new PSCell; v) an indication of an SCell to be used as the new PSCell; or vi) an indication of a secondary BS in which the new PSCell is changed.

When the UE receives an RRC signaling from either MeNB or SeNB that includes any indication of PSCell change for the concerned SeNB, the UE checks whether the PSCell changes from one cell to another cell (S1605).

If the PSCell is not changed by the PSCell change procedure, the UE deactivates the one or more SCells in the secondary BS (S1607).

If the new PSCell different from the PSCell is added by the SCG change procedure, the UE deactivates the PSCell and all SCells except a new PSCell in the secondary BS (S1609). For the SeNB in which the old PSCell is included, the UE deactivates all configured SCG SCells. In this case, the UE stops the sCellDeactivationTimer for all configured SCG SCells; or the UE considers the sCellDeactivationTimer as expired for all configured SCG SCells while not stopping the sCellDeactivationTimer.

Meanwhile, for the SeNBs other than the SeNB in which the old PSCell is included, the UE does nothing for the SCG SCells. I.e., the UE doesn't change the Activation/Deactivation state of SCG SCells. Indeed, for the MeNB, the UE does nothing for the MCG SCells. I.e., the UE doesn't change the Activation/Deactivation state of MCG SCells.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for a User Equipment (UE) operating in a wireless communication system, the method comprising:
   receiving an Radio Resource Control (RRC) reconfiguration message indicating a change procedure of a secondary cell group (SCG) associated with secondary eNB (SeNB) while maintaining a connection with a master eNB (MeNB), wherein the SCG comprises a Primary-Secondary Cell (PSCell) and one or more SCells;
   deactivating the one or more SCells of the SCG if the PSCell is not changed by the change procedure; and
   deactivating the PSCell and all SCells of the SCG except a new PSCell, if the new PSCell different from the PSCell is added by the change procedure.

2. The method according to claim 1, wherein the MeNB is associated with a master cell group (MCG), and the MCG comprises a Primary Cell (PCell) and one or more Secondary Cells (SCells).

3. The method according to claim 1, wherein if the RRC reconfiguration message indicates changing from an old PSCell to a new PSCell, the RRC reconfiguration message includes at least one of:
   an indication of the new PSCell;
   an indication of changing from the old PSCell to the new PSCell;
   an indication of releasing of the old PSCell and addition of the new PSCell;
   an indication of addition of the new PSCell;
   an indication of an SCell to a used as the new PSCell; or
   an indication of a SeNB in which the new PSCell is changed.

4. The method according to claim 1, further comprising:
   stopping a SCell deactivation timer for SCells of the SCG when the one or more SCells of the SCG are deactivated.

5. The method according to claim 2, wherein the UE does not change an activation or deactivation state of the one or more SCells of the MCG.

6. A User Equipment (UE) operating in a wireless communication system, the UE comprising:
   a Radio Frequency (RF) module; and
   a processor operably coupled with the RF module and configured to,
   receive a Radio Resource Control (RRC) reconfiguration message indicating a change procedure of a secondary cell group (SCG) associated with secondary eNB (SeNB) while maintaining a connection with a master eNB (MeNB), wherein the SCG comprises a Primary-Secondary Cell (PSCell) and one or more SCells,
   deactivate the one or more SCells of the SCG if the PSCell is not changed by the change procedure, and
   deactivate the PSCell and all SCells of the SCG except a new PSCell, if the new PSCell different from the PSCell is added by the change procedure.

7. The UE according to claim 6, wherein the MeNB is associated with a master cell group (MCG), and the MCG comprises a Primary Cell (PCell) and one or more Secondary Cells (SCells).

8. The UE according to claim 6, wherein if the RRC reconfiguration message indicates changing from an old PSCell to a new PSCell, the RRC reconfiguration message includes at least one of:
   an indication of the new PSCell;
   an indication of changing from the old PSCell to the new PSCell;
   an indication of releasing of the old PSCell and addition of the new PSCell;
   an indication of addition of the new PSCell;
   an indication of an SCell to a used as the new PSCell; or
   an indication of a SeNB in which the new PSCell is changed.

9. The UE according to claim 6, wherein the processor is further configured to:
   stop a SCell deactivation timer for SCells of the SCG when the one or more SCells of the SCG are deactivated.

10. The UE according to claim 7, wherein the processor does not change activation or deactivation state of the one or more SCells of the MCG.

* * * * *